United States Patent
Araki et al.

(10) Patent No.: US 6,682,776 B2
(45) Date of Patent: Jan. 27, 2004

(54) METHOD FOR PREPARING SURFACE-MODIFIED NICKEL POWDER

(75) Inventors: Takayuki Araki, Yamaguchi (JP); Takashi Mukuno, Yamaguchi (JP)

(73) Assignee: Mitsui Mining and Smelting Co., Ltd., Tokyo (JP)

(*) Notice: Subject to any disclaimer, the term of this patent is extended or adjusted under 35 U.S.C. 154(b) by 0 days.

(21) Appl. No.: 10/318,027

(22) Filed: Dec. 13, 2002

(65) Prior Publication Data

US 2003/0118723 A1 Jun. 26, 2003

Related U.S. Application Data

(62) Division of application No. 09/708,001, filed on Nov. 8, 2000.

(30) Foreign Application Priority Data

Nov. 9, 1999 (JP) ............................................. 11-318311

(51) Int. Cl.[7] .................................................. B05D 7/00
(52) U.S. Cl. ...................... 427/216; 427/212; 427/215; 427/226; 427/372.2; 427/376.2; 427/376.4; 428/403; 428/404
(58) Field of Search .............................. 427/216, 212, 427/215, 226, 372.2, 376.2, 376.4; 428/403, 404

(56) References Cited

U.S. PATENT DOCUMENTS 4,755,493 A 7/1988 Takeuchi et al. ............ 501/134
6,007,743 A 12/1999 Asada et al. ................ 252/513
6,503,560 B2 * 1/2003 Toshima et al. ............ 427/216
6,582,763 B1 * 6/2003 Nishimura et al. ......... 427/216

FOREIGN PATENT DOCUMENTS

JP      11-124602      5/1999

* cited by examiner

Primary Examiner—Michael Barr
Assistant Examiner—Elena Tsoy
(74) Attorney, Agent, or Firm—Young & Thompson

(57) ABSTRACT

Herein disclosed is surface-modified nickel fine powder in which a precursor of barium titanate having a perovskite structure and consisting of a reaction product of a soluble titanium-containing compound and a soluble barium-containing compound is adhered to the surface of individual nickel fine particles, wherein the fine powder shows X-ray diffraction peaks of nickel and is free of any peak of barium titanate having a perovskite structure in the X-ray diffraction pattern determined by the X-ray diffraction method, but the fine powder shows X-ray diffraction peaks of both nickel and barium titanate having a perovskite structure in the X-ray diffraction pattern after the fine powder is subjected to a heat-treatment at a temperature of not less than 400° C. The nickel fine powder has a small heat shrinkage factor upon firing and improved resistance to oxidation. The powder permits the inhibition of any such phenomenon that nickel is oxidized and the oxidized nickel penetrates into a ceramic dielectric material during firing. The powder is suitable for use as a material for a conductive paste and, in particular, for forming a conductive paste used in making a multilayer ceramic capacitor.

6 Claims, 2 Drawing Sheets

METHOD FOR PREPARING SURFACE-MODIFIED NICKEL POWDER

This application is a division of co-pending application Ser. No. 09/708,001, filed on Nov. 8, 2000, the entire contents of which are hereby incorporated by reference.

BACKGROUND OF THE INVENTION (a) Field of the Invention

The present invention relates to nickel fine powder, which is surface-modified with barium titanate having a perovskite structure, nickel fine powder, which is surface-modified with a precursor of the barium titanate and a method for preparing the surface-modified nickel fine powder. More specifically, the present invention relates to nickel fine powder surface-modified with barium titanate having a perovskite structure and nickel fine powder surface-modified with a precursor of the barium titanate, which have low heat shrinkage factors upon firing and improved resistance to oxidation during firing, which permit the inhibition of any such phenomenon that nickel is oxidized and the oxidized nickel diffuses into a ceramic dielectric material during firing, which is suitable for use as a material for a conductive paste and, in particular, for forming a conductive paste used in making a multilayer ceramic capacitor, as well as a method for preparing the same.

(b) Description of the Prior Art

Conventionally, there have mainly been used noble metal pastes as conductive pastes. However, there have recently been used base metal pastes in order to reduce the production cost and, in particular, nickel pastes have widely been used.

However, the nickel paste suffers from the following various problems. For instance, the nickel paste has a high heat shrinkage factor upon firing as compared with the noble metal paste. In addition, it is inferior in the resistance to oxidation and as a result, there has been observed a phenomenon in which nickel is oxidized and the resulting nickel oxide diffuses into a ceramic dielectric material during firing.

To solve the foregoing drawbacks observed when a nickel paste is used, various techniques have been reported and proposed. For instance, Japanese Un-Examined Patent Publication No. Sho 57-30308 discloses a method comprising the step of adsorbing, on the surface of nickel fine particles, ceramic powder (co-material) having a composition identical to that of a dielectric ceramic material, which constitutes a ceramic capacitor. In addition, Japanese Un-Examined Patent Publication No. Hei 11-124602 discloses a method comprising the step of forming, on the surface of nickel fine particles, a layer of a double oxide represented by the following general formula:

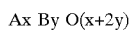

(In the general formula, A represents at least one element selected from the group consisting of Ca, Sr and Ba; B represents at least one element selected from the group consisting of Ti and Zr; x and y are numerical values which satisfy the relation: $0.5 \leq y/x \leq 4.5$).

If a dense barium titanate (BaTiO3) film can be closely adhered to the surface of nickel fine particles, the resulting nickel fine particles permits the formation of a conductive nickel paste, which has a small heat shrinkage factor upon firing, improved resistance to oxidation and which can inhibit any occurrence of a phenomenon such that nickel is oxidized and the resulting nickel oxide diffuses into a ceramic dielectric material during firing. In fact, however, barium titanate has low adhesion to the surface of nickel fine particles and thus it is quite difficult to form a dense barium titanate film on the surface of nickel fine particles.

For instance, in the method disclosed in Japanese Un-Examined Patent Publication No. Sho 57-30308, the dielectric ceramic powder (co-material) and the nickel fine powder do not exert any adhesive force against each other and therefore, they are easily disconnected from one another upon the preparation of a paste. For this reason, the resulting paste is not sufficiently improved in the heat shrinkage factor upon firing, the resistance to oxidation and the phenomenon such that the oxidized nickel diffuses into the ceramic dielectric material during firing. Moreover, in the method disclosed in Japanese Un-Examined Patent Publication No. Hei 11-124602, the nickel powder is formed by spraying a solution containing respective pyrolytic compounds capable of forming a double oxide and a nickel raw material and then thermally decomposing these ingredients to form nickel powder containing the double oxide thus pyrolytically formed. However, this method results in the formation of the double oxide within the nickel particle.

SUMMARY OF THE INVENTION

Accordingly, it is an object of the present invention to provide nickel fine powder, which is surface-modified with barium titanate having a perovskite structure, which has a low heat shrinkage factor upon firing and improved resistance to oxidation, and which permit the inhibition of any such phenomenon that nickel is oxidized and the oxidized nickel penetrate into a ceramic dielectric material during firing.

It is another object of the present invention to provide nickel fine powder, which is surface-modified with barium titanate having a perovskite structure, which is suitable for use as a material for a conductive paste and, in particular, for forming a conductive paste used in making a multilayer ceramic capacitor.

It is a further object of the present invention to provide nickel fine powder, which is surface-modified with a precursor of the barium titanate.

It is a still further object of the present invention to provide a method for preparing the foregoing nickel fine powder, which is surface-modified with barium titanate having a perovskite structure and with a precursor of the barium titanate.

The inventors of this invention have conducted various studies to solve the foregoing problems associated with the conventional nickel fine powder used for making a conductive nickel paste. As a result, the inventors have found that the foregoing objects of the present invention can efficiently be achieved by bringing nickel fine particles into contact with a solution containing a combination of a soluble titanium compound and a soluble barium compound, which can form barium titanate having a perovskite structure through a heat-treatment, to thus form a precursor consisting of a reaction product of the soluble titanium compound and the soluble barium compound and to thus adhere the precursor to the surface of the individual nickel fine particles, then drying the nickel fine particles provided thereon with the precursor attached thereto (or adhering the precursor to the surface of the individual nickel fine particles, drying them and subjecting them to a heat-treatment at a temperature of less than 400° C.) (at this stage, a precursor consisting of the reaction product of the soluble titanium-containing compound and the soluble barium-containing compound is formed on the surface of the nickel fine particles), then subjecting them to a heat-treatment at a temperature of not less than 400° C. to thus convert the precursor on the surface of the nickel fine powder into barium titanate having a perovskite structure and to thus cover the surface of the nickel fine particles with the barium titanate having a specific structure, in place of directly covering the surface of nickel fine particles with barium titanate having a perovskite structure. The inventors have thus completed the present invention on the basis of the foregoing finding.

According to an aspect of the present invention, there is provided surface-modified nickel fine powder. The surface-modified nickel fine powder of the present invention is nickel fine powder, in which a precursor of barium titanate having a perovskite structure and consisting of a reaction product of a soluble titanium-containing compound and a soluble barium-containing compound is attached to the surface of individual nickel fine particles. The surface-modified nickel fine powder is characterized in that the fine powder shows X-ray diffraction peaks of nickel and is free of any peak of barium titanate having a perovskite structure in the X-ray diffraction pattern determined by the X-ray diffraction method, but the fine powder shows X-ray diffraction peaks of both nickel and barium titanate having a perovskite structure in the X-ray diffraction pattern after the fine powder is subjected to a heat-treatment at a temperature of not less than 400° C.

According to a second aspect of the present invention, there is provided a method for preparing nickel fine powder surface-modified with a precursor. The method of the present invention comprises the steps of bringing nickel fine particles into contact with a solution containing a combination of a soluble titanium-containing compound and a soluble barium-containing compound, which can form barium titanate having a perovskite structure through a heat-treatment at a temperature of not less than 400° C., to thus adhere, to the surface of the individual nickel fine particles, a precursor consisting of the reaction product of the soluble titanium-containing compound and the soluble barium-containing compound and then drying the fine particles; or adhering such a precursor to the surface of the individual nickel fine particles, then drying the same and heat-treating the particles at a temperature of less than 400° C.

According to a third aspect of the present invention, there is provided nickel fine powder surface-modified with barium titanate having a perovskite structure, in which the barium titanate having a perovskite structure is adhered to the surface of the individual nickel fine particles and the rate of increase in the weight of the fine powder observed after allowing them to stand in the atmosphere maintained at 400° C. for 2 hours is not more than ½ time that observed for the untreated elemental nickel fine powder.

According to a fourth aspect of the present invention, there is provided a method for preparing the foregoing nickel fine powder surface-modified with the barium titanate having a perovskite structure. The method comprises the steps of bringing nickel fine particles into contact with a solution containing a combination of a soluble titanium-containing compound and a soluble barium-containing compound, which can form barium titanate having a perovskite structure through a heat-treatment at a temperature of not less than 400° C., to thus adhere, to the surface of the individual nickel fine particles, a precursor consisting of the reaction product of the soluble titanium-containing compound and the soluble barium-containing compound, then drying the fine particles and heat-treating the fine particles at a temperature of not less than 400° C.; or adhering such a precursor to the surface of the individual nickel fine particles, then drying the same, heat-treating the particles at a temperature of less than 400° C. and thereafter further heat-treating the fine particles at a temperature of not less than 400° C.

DESCRIPTION OF THE PREFERRED EMBODIMENTS

Figure 1:
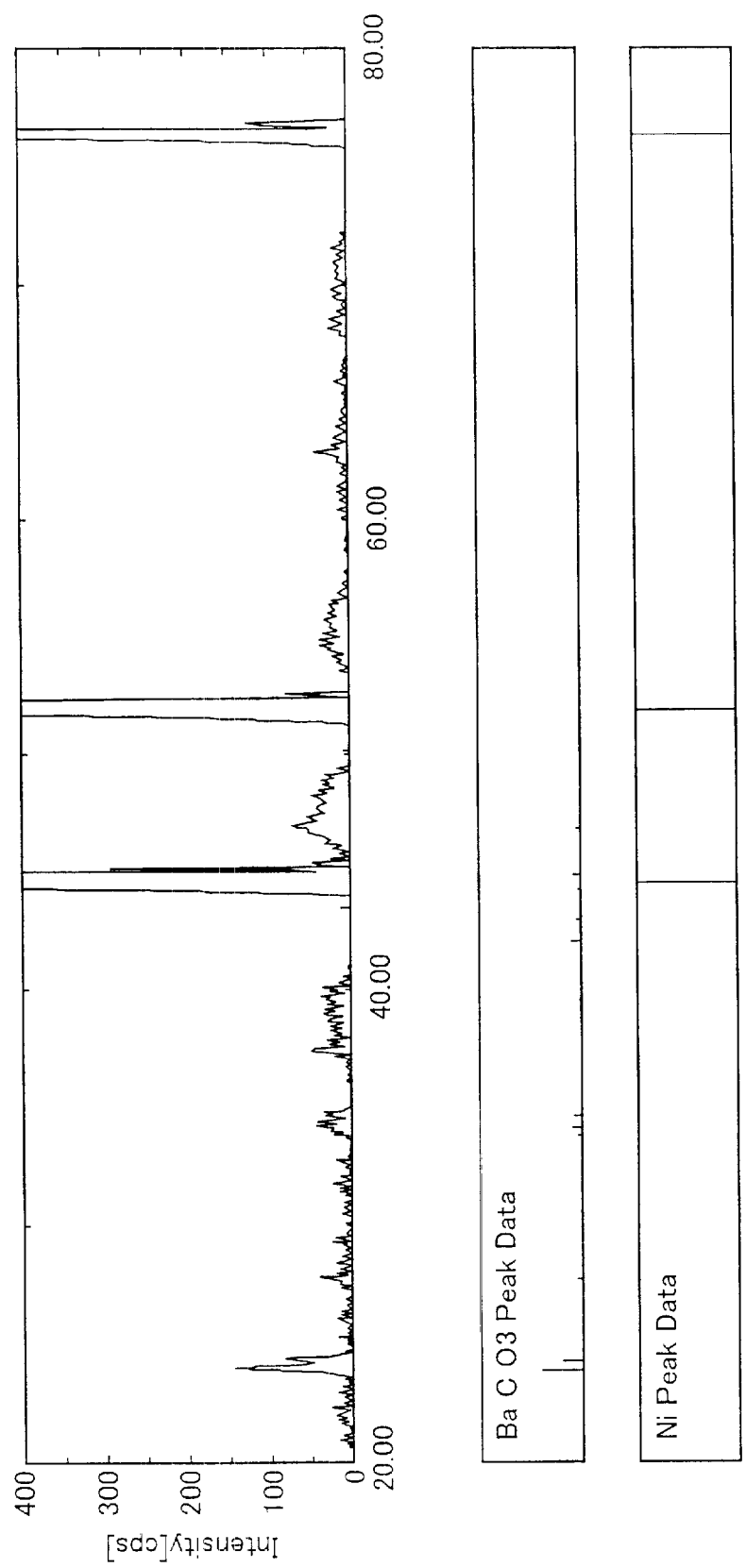
FIG. 1 is an X-ray diffraction pattern, as determined by the X-ray diffraction method, of nickel fine powder provided thereon with the barium titanate precursor, prior to a heat-treatment and prepared in Example 1.

The titanium-containing compounds usable in the combination of the soluble titanium-containing compound and the soluble barium-containing compound, which can form the precursor of the barium titanate having a perovskite structure through a heat-treatment at a temperature of not less than 400° C. are, for instance, those listed below: potassium titanium oxalate, titanium sulfate and titanium trichloride. On the other hand, examples of the foregoing barium-containing compounds include barium chloride, barium bromide, barium nitrate and barium oxide.

In the present invention, it is also possible to simultaneously use a soluble compound of other element capable of forming a perovskite structure in addition to the foregoing soluble titanium-containing compounds and soluble barium-containing compounds. Examples of such soluble compounds of other elements are soluble zirconium-containing compounds, soluble strontium-containing compounds, soluble magnesium-containing compounds, and soluble calcium-containing compounds. Thus, in the barium titanate having a perovskite structure of the present invention, a part of the titanium may be replaced with, for instance, zirconium or a part of the barium may be replaced with, for instance, strontium, magnesium and/or calcium.

In the present invention, the precursor consisting of the reaction product of a soluble titanium-containing compound and a soluble barium-containing compound can be adhered to the surface of individual nickel fine particles by a method comprising the step of simply mixing a solution containing these soluble titanium-containing and barium-containing compounds with the nickel fine particles to thus bring the former into contact with the latter. Moreover, the drying of the nickel fine particles provided thereon with the precursor adhered thereto, the heat-treatment of the fine particles at a temperature of less than 400° C., and the heat-treatment at a temperature of not less than 400° C. can be carried out according to the usual methods well-known to those skilled in the art under the usual conditions. For instance, the drying may be carried out at ordinary temperature or under heating. In addition, the heat-treatment at a temperature of less than 400° C. and the heat-treatment at a temperature of not less than 400° C. can preferably be performed in an inert atmosphere or a reducing atmosphere, for instance, an inert atmosphere of nitrogen or the like or a reducing atmosphere containing nitrogen/hydrogen. The heat-treatment at a temperature of not less than 400° C. is desirably carried out at a temperature of not less than 500° C.

In the present invention, the drying and the heat-treatment at a temperature of less than 400° C. may continuously or simultaneously be carried out in a high temperature atmosphere of less than 400° C., in a drying device such as a spray-drying device, a rotary drying device or a stirring and drying device. Similarly, the drying and the heat-treatment at a temperature of not less than 400° C. may continuously or simultaneously be carried out in a high temperature atmosphere of not less than 400° C., in a drying device such as a spray-drying device, a rotary drying device or a stirring and drying device.

The nickel fine powder surface-modified with the precursor according to the present invention does not show any X-ray diffraction peak for the soluble titanium-containing and barium-containing compounds used and for barium titanate having a perovskite structure in the X-ray diffraction pattern as determined by the X-ray diffraction method at all. However, the surface-modified nickel fine powder shows X-ray diffraction peaks for nickel and X-ray diffraction peaks for substances other than the starting raw materials (for instance, in Examples as will be described later, the nickel fine powder showed X-ray diffraction peaks for barium carbonate and unidentifiable X-ray diffraction peaks). For this reason, the precursor is not a simple mixture of the titanium-containing and barium-containing compounds, but is a reaction product thereof. However, the details of the reaction product have not yet been clearly elucidated.

However, if the nickel fine powder surface-modified with such a precursor is heat-treated at a temperature of not less than 400° C. and preferably in an inert or reducing atmosphere, the heat-treated nickel fine powder shows X-ray diffraction peaks for nickel and barium titanate having a perovskite structure. In other words, the nickel fine powder surface-treated with the precursor is converted into nickel fine powder surface-modified with barium titanate having a perovskite structure. Therefore, in the nickel fine powder surface-modified-with such a precursor according to the present invention, it is clear that the precursor adhered to the surface of the individual nickel fine particles is a precursor of the barium titanate having a perovskite structure.

In the surface-modified nickel fine powder obtained by simply adhering the precursor to the surface of individual nickel fine particles and then drying, the adhesive force exerting between the precursor and the nickel fine particles is insufficient. For this reason, the surface-modified nickel fine powder cannot be used for preparing a paste without any pre-treatment and the handling such as storage and transportation of the fine powder is very difficult. On the other hand, in case of the surface-modified nickel fine powder obtained by adhering a precursor to the surface of individual nickel fine particles, drying the fine particles and then heat-treating the same at a temperature of less than 400° C., the precursor and the nickel fine particles are considerably strongly adhered to one another. Therefore, the fine powder is still insufficient for use in making a paste, but the handling thereof such as the storage or transportation thereof becomes easy. Accordingly, the heat-treatment of such surface-modified nickel fine powder at a temperature of not less than 400° C. can be carried out at a separate place.

In the nickel fine powder surface-modified with barium titanate having a perovskite structure according to the present invention, the barium titanate having a perovskite structure is adhered to the surface of individual nickel fine particles to thus form a dense and stable film on the surface. Therefore, the paste formed from the nickel fine powder of the present invention has a small heat shrinkage factor upon firing and high resistance to oxidation. In addition, the rate of increase in weight of the fine powder observed when it is allowed to stand in the atmosphere maintained at 400° C. for 2 hours is ½ time that observed for the untreated nickel fine powder. Moreover, the presence of such a film on the surface of the fine particles permits the inhibition of any penetration of oxidized nickel into the ceramic dielectric material during firing.

The present invention will hereunder be described in more detail with reference to the following working Examples and Comparative Examples, but the present invention is not restricted to these specific Examples at all.

EXAMPLE 1

A slurry was prepared by dispersing nickel fine powder having an average particle size of 0.6 μm in pure water. To the resulting slurry, there was added a solution prepared by dissolving potassium titanium oxalate and barium chloride in an amount of 3% by weight as expressed in terms of the amount of barium titanate on the basis of the amount of the nickel fine powder. In this respect, the slurry was continuously stirred so that the surface of the nickel fine particles was uniformly covered with the precursor of barium titanate. Then the slurry was filtered, followed by drying to give nickel fine powder to which the resulting precursor of barium titanate was adhered. The resulting nickel fine powder was examined by the X-ray diffraction method to thus obtain an X-ray diffraction pattern. The X-ray diffraction pattern is shown in FIG. 1. As will be seen from the data shown in FIG. 1, the nickel fine powder showed X-ray diffraction peaks of nickel, but there was not confirmed the presence of any X-ray diffraction peak for the other starting raw materials and barium titanate having a perovskite structure. However, there were observed X-ray diffraction peaks for barium carbonate and unidentifiable X-ray diffraction peaks.

Figure 2:
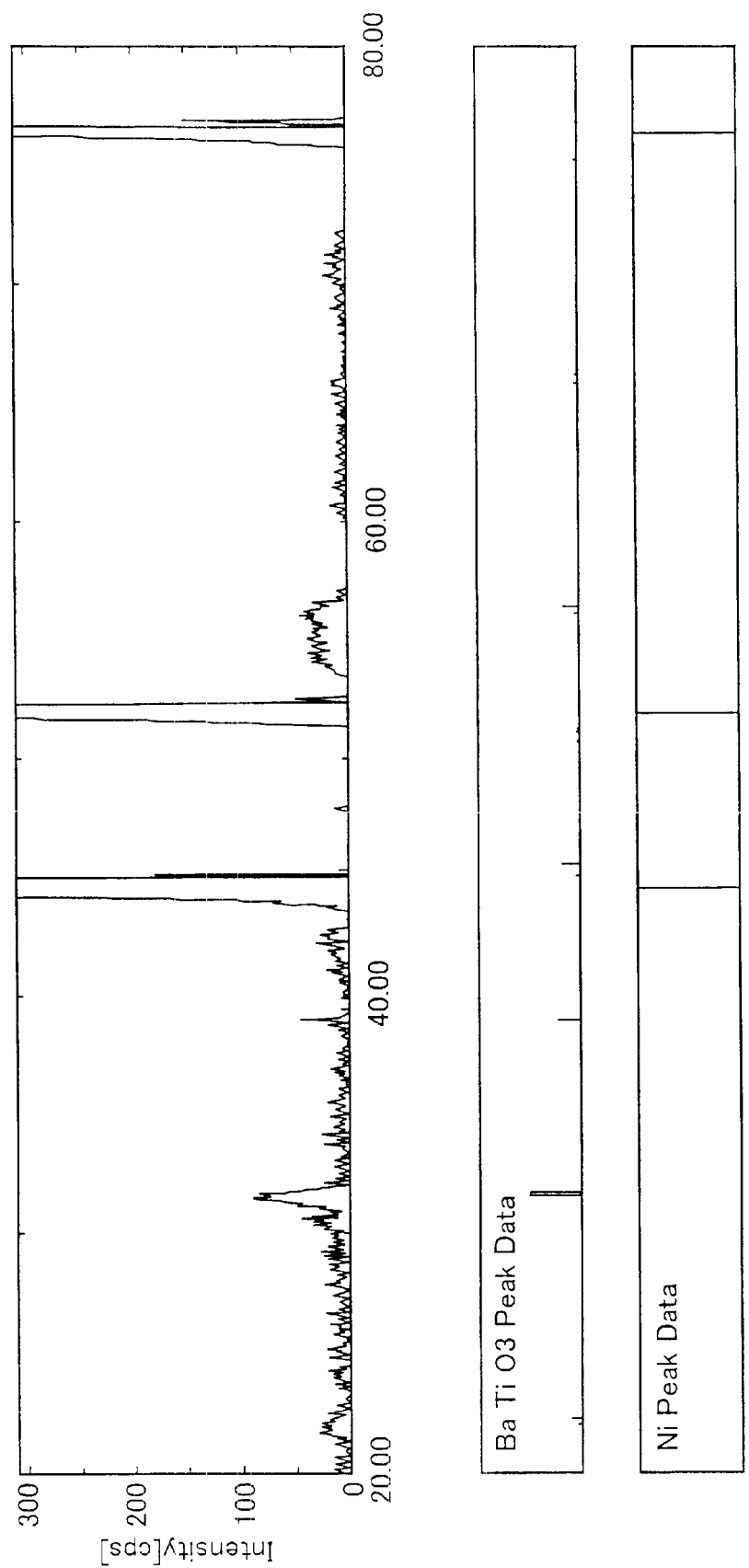
FIG. 2 is an X-ray diffraction pattern, as determined by the X-ray diffraction method, of nickel fine powder provided thereon with the barium titanate, after a heat-treatment and prepared in Example 1.

The nickel fine powder, to which the barium titanate precursor thus prepared was adhered, was heat-treated at 500° C. in a nitrogen gas atmosphere. The heat-treated fine powder was examined by the X-ray diffraction method. The X-ray diffraction pattern thus obtained is shown in FIG. 2. The data shown in FIG. 2 clearly indicate that the heat-treated nickel fine powder showed X-ray diffraction peaks of both nickel and barium titanate having a perovskite structure.

The resulting nickel fine powder surface-modified with the barium titanate having a perovskite structure was allowed to stand in the air maintained at 400° C. for 2 hours and then the rate of increase in weight thereof due to oxidation was determined. The results thus obtained are summarized in the following Table 1.

Moreover, 0.5 g of the nickel fine powder surface-modified with the barium titanate having a perovskite structure was pressed at a pressure of 98 MPa to thus form the nickel fine powder into a pellet having a diameter of 5 mm and a height of about 6 mm. The resulting pellet was heated up to 1100° C. at a rate of heating of 10° C./min in a nitrogen gas atmosphere using a thermomechanical analysis device (TMA/SS6000 available from Seiko Instruments Inc.) and then the heat shrinkage factor of the pellet after heating was determined. The results obtained are listed in the following Table 1. In this connection, the heat shrinkage factor is a value relative to that observed before heating.

Separately, the nickel fine powder surface-modified with the precursor of barium titanate having a perovskite structure prepared above was heat-treated at 300° C. in a nitrogen gas atmosphere. The nickel fine powder thus heat-treated was examined by the X-ray diffraction method to obtain an X-ray diffraction pattern. According to this X-ray diffraction pattern, it was confirmed that the fine powder showed X-ray diffraction peaks for nickel like the fine powder prior to the heat-treatment, but the fine powder did not show any X-ray diffraction peak for the other starting raw materials and for the barium titanate having a perovskite structure. However, it was confirmed that the fine powder showed X-ray diffraction peaks for barium carbonate and unidentifiable X-ray diffraction peaks. Moreover, it was found that the adhesive force exerting between the precursor and the nickel fine particles observed for the fine powder after the heat-treatment at 300° C. was considerably improved as compared with that observed for the nickel fine powder prior to the heat-treatment at 300° C.

EXAMPLE 2

A slurry was prepared by dispersing nickel fine powder having an average particle size of 0.5 $\mu$m in pure water. To the resulting slurry, there was added a solution prepared by dissolving potassium titanium oxalate and barium chloride in an amount of 3% by weight as expressed in terms of the amount of barium titanate on the basis of the amount of the nickel fine powder. In this respect, the slurry was continuously stirred so that the surface of the nickel fine particles was uniformly covered with the precursor of barium titanate. Then the slurry was filtered, followed by drying to give nickel fine powder to which the resulting precursor of barium titanate was adhered. The resulting nickel fine powder was examined by the X-ray diffraction method to thus obtain an X-ray diffraction pattern. As a result, it was confirmed that the fine powder showed X-ray diffraction peaks of nickel, but the powder did not show any X-ray diffraction peak corresponding to the other starting raw materials and barium titanate having a perovskite structure at all. However, it was confirmed that the fine powder showed X-ray diffraction peaks ascribed to barium carbonate and unidentifiable X-ray diffraction peaks.

The nickel fine powder, to which the barium titanate precursor thus prepared was adhered, was heat-treated at 500° C. in a nitrogen gas atmosphere. The heat-treated fine powder was examined by the X-ray diffraction method. The X-ray diffraction pattern thus obtained clearly indicates that the heat-treated nickel fine powder showed X-ray diffraction peaks ascribed to both nickel and barium titanate having a perovskite structure.

The resulting nickel fine powder surface-modified with the barium titanate having a perovskite structure was inspected for the rate of increase in weight thereof due to oxidation and the heat shrinkage factor according to the same method used in Example 1. The results thus obtained are summarized in the following Table 1.

EXAMPLE 3

A slurry was prepared by dispersing nickel fine powder having an average particle size of 0.2 $\mu$m in pure water. To the resulting slurry, there was added a solution prepared by dissolving potassium titanium oxalate and barium chloride in an amount of 5% by weight as expressed in terms of the amount of barium titanate on the basis of the amount of the nickel fine powder. In this respect, the slurry was continuously stirred so that the surface of the nickel fine particles was uniformly covered with the precursor of barium titanate. Then the slurry was filtered, followed by drying to give nickel fine powder to which the resulting precursor of barium titanate was adhered. The resulting nickel fine powder was examined by the X-ray diffraction method to thus obtain an X-ray diffraction pattern. As a result, it was confirmed that the fine powder showed X-ray diffraction peaks of nickel, but the powder did not show any X-ray diffraction peak corresponding to the other starting raw materials and barium titanate having a perovskite structure at all. However, it was confirmed that the fine powder showed X-ray diffraction peaks ascribed to barium carbonate and unidentifiable X-ray diffraction peaks.

The nickel fine powder, to which the barium titanate precursor thus prepared was adhered, was heat-treated at 500° C. in a nitrogen gas atmosphere. The heat-treated fine powder was examined by the X-ray diffraction method. The X-ray diffraction pattern thus obtained clearly indicates that the heat-treated nickel fine powder showed X-ray diffraction peaks ascribed to both nickel and barium titanate having a perovskite structure.

The resulting nickel fine powder surface-modified with the barium titanate having a perovskite structure was inspected for the rate of increase in weight thereof due to oxidation and the heat shrinkage factor according to the same method used in Example 1. The results thus obtained are summarized in the following Table 1.

Comparative Example 1

Nickel fine powder free of any coated film on the surface of the fine particles and having an average particle size of 0.5 $\mu$m was inspected for the rate of increase in weight thereof due to oxidation and the heat shrinkage factor in the same manner used in Example 1. The results thus obtained are listed in the following Table 1. As a result, it was found that the fine powder had high heat shrinkage factor and a high rate of increase in weight as compared with those observed for the fine powder of Example 2. If whole of the nickel fine powder is oxidized, the increase in weight thereof should reach about 27%. Accordingly, the rate of oxidation of the fine powder was calculated to be about 81%.

Comparative Example 2

Nickel fine powder free of any coated film on the surface of the fine particles and having an average particle size of 0.2 $\mu$m was inspected for the rate of increase in weight thereof due to oxidation and the heat shrinkage factor in the same manner used in Example 1. The results thus obtained are listed in the following Table 1. As a result, it was found that the fine powder had high heat shrinkage factor and a high rate of increase in weight as compared with those observed for the fine powder of Example 3.

Comparative Example 3

The surface of nickel fine powder having an average particle size of 0.5 $\mu$m was covered with ultrafine particles (having an average particle size of 0.05 $\mu$m) of barium titanate having a perovskite structure in an amount of 3% by weight with respect to the amount of the nickel fine powder by a mechanical processing method. The resulting nickel fine powder surface-modified with barium titanate was inspected for the rate of increase in weight thereof due to oxidation and the heat shrinkage factor in the same manner used in Example 1. The results thus obtained are listed in the following Table 1. As a result, it was found that this mechanical treatment could inhibit any increase in the heat shrinkage factor, but it could not improve the resistance to oxidation at all.

TABLE 1

|  | Rate of Increase in Weight due to Oxidation (%) | Heat Shrinkage Factor (%) |
|---|---|---|
| Example 1 | 4 | 1.0 |
| Example 2 | 6 | 1.5 |
| Example 3 | 10 | 0.5 |
| Comparative Example 1 | 22 | 14.5 |
| Comparative Example 2 | 22 | 14.5 |
| Comparative Example 3 | 22 | 8.0 |

As has been described above in detail, the nickel fine powder surface-modified with barium titanate having a perovskite structure according to the present invention has a small heat shrinkage factor upon firing and improved resistance to oxidation, permits the inhibition of any such phenomenon that nickel is oxidized and the oxidized nickel penetrates into a ceramic dielectric material during firing, and is suitable for use as a material for a conductive paste and, in particular, for forming a conductive paste used in making a multilayer ceramic capacitor.

What is claimed is:

1. A method for preparing nickel fine powder surface-modified with a precursor comprising the steps of bringing nickel fine particles into contact with a solution containing a combination of a soluble titanium-containing compound and a soluble barium-containing compound, which can form barium titanate having a perovskite structure through a heat-treatment at a temperature of not less than 400° C to thus adhere, to the surface of the individual nickel fine particles, a precursor consisting of the reaction product of the soluble titanium-containing compound and the soluble barium-containing compound and then drying the fine particles.

2. The method as set forth in claim 1, wherein the precursor is adhered to the surface of the individual nickel fine particles, dried and then heat-treated at a temperature of less than 400° C.

3. A method for preparing nickel fine powder surface-modified with barium titanate having a perovskite structure comprising the steps of bringing nickel fine particles into contact with a solution containing a combination of a soluble titanium-containing compound and a soluble barium-containing compound, which can form barium titanate having a perovskite structure through a heat-treatment at a temperature of not less than 400° C. to thus adhere, to the surface of the individual nickel fine particles, a precursor consisting of the reaction product of the soluble titanium-containing compound and the soluble barium-containing compound, then drying the fine particles and heat-treating the fine particles at a temperature of not less than 400° C.

4. The method as set forth in claim 3, wherein the precursor is adhered to the surface of the individual nickel fine particles, dried, then heat-treated at a temperature of less than 400° C. and then heat-treated at a temperature of not less than 400° C.

5. The method as set forth in claim 3 wherein the heat-treatment is carried out in an inert gas atmosphere or a reducing atmosphere.

6. The method as set forth in claim 4 wherein the heat-treatment is carried out in an inert gas atmosphere or a reducing atmosphere.

* * * * *